US007912673B2

(12) United States Patent
Hébert et al.

(10) Patent No.: US 7,912,673 B2
(45) Date of Patent: Mar. 22, 2011

(54) AUTO-REFERENCED SYSTEM AND APPARATUS FOR THREE-DIMENSIONAL SCANNING

(75) Inventors: Patrick Hébert, Sainte-Foy (CA); Éric Saint-Pierre, Lévis (CA); Dragan Tubic, Charlesbourg (CA)

(73) Assignee: Creaform Inc., Levis, Quebec (CA)

( * ) Notice: Subject to any disclaimer, the term of this patent is extended or adjusted under 35 U.S.C. 154(b) by 418 days.

(21) Appl. No.: 11/817,300

(22) PCT Filed: Mar. 13, 2006

(86) PCT No.: PCT/CA2006/000370
§ 371 (c)(1),
(2), (4) Date: Aug. 28, 2007

(87) PCT Pub. No.: WO2006/094409
PCT Pub. Date: Sep. 14, 2006

(65) Prior Publication Data
US 2008/0201101 A1    Aug. 21, 2008

Related U.S. Application Data

(60) Provisional application No. 60/660,471, filed on Mar. 11, 2005.

(51) Int. Cl.
*G01C 9/00* (2006.01)
*G01B 11/30* (2006.01)
*G06K 9/36* (2006.01)
(52) U.S. Cl. .................. 702/153; 356/603; 382/285
(58) Field of Classification Search .................. 702/153, 702/150, 152, 81, 84–85, 94–95, 127, 155–159, 702/167–168, 189; 382/108, 154, 190, 276, 382/285, 291, 295, 312, 313, 318, 321; 356/601–603, 606–608, 612, 614, 620–623, 356/4.01, 4.03, 610
See application file for complete search history.

(56) References Cited

U.S. PATENT DOCUMENTS
4,645,348 A * 2/1987 Dewar et al. .................. 356/603
(Continued)

FOREIGN PATENT DOCUMENTS
DE    19502459    8/1996
(Continued)

OTHER PUBLICATIONS

Pappa et al., Dot-Projection Photogrammetry and Videogrammetry of Gossamer Space Structures, Jan. 2003, NASA/TM-2003-212146.*
(Continued)

*Primary Examiner* — Michael P Nghiem
*Assistant Examiner* — Toan M Le
(74) *Attorney, Agent, or Firm* — Fasken Martineau

(57) ABSTRACT

A system, apparatus and method for three-dimensional scanning and digitization of the surface geometry of objects are claimed. The system includes a hand-held apparatus that is auto-referenced. The system is auto-referenced since it does not need any positioning device to provide the 6 degree of freedom transformations that are necessary to integrate 3D measurements in a global coordinate system while the apparatus is manipulated to scan the surface. The system continuously calculates its own position and orientation from observation while scanning the surface geometry of an object. To do so, the system exploits a triangulation principle and integrates an apparatus that captures both surface points originating from the reflection of a projected laser pattern on an object's surface and 2D positioning features originating from the observation of target positioning features.

24 Claims, 3 Drawing Sheets

U.S. PATENT DOCUMENTS

| | | | |
|---|---|---|---|
| 5,410,141 | A | 4/1995 | Koenck et al. |
| 5,661,667 | A * | 8/1997 | Rueb et al. ............ 702/95 |
| 6,101,455 | A * | 8/2000 | Davis ............ 702/94 |
| 6,246,468 | B1 * | 6/2001 | Dimsdale ............ 356/4.02 |
| 6,508,403 | B2 | 1/2003 | Arsenault et al. |
| 6,542,249 | B1 | 4/2003 | Kofman et al. |
| 7,306,339 | B2 * | 12/2007 | Kaufman et al. ............ 353/28 |
| 7,487,063 | B2 * | 2/2009 | Tubic et al. ............ 702/152 |
| 2002/0041282 | A1 | 4/2002 | Kitaguchi et al. |
| 2008/0201101 | A1 | 8/2008 | Hebert et al. |

FOREIGN PATENT DOCUMENTS

| | | |
|---|---|---|
| DE | 19634254 | 3/1997 |
| DE | 19925462 | 2/2001 |
| JP | 04172213 | 6/1992 |
| JP | 07012534 | 1/1995 |
| JP | 11101623 | 4/1999 |
| JP | 2001119722 | 4/2001 |
| WO | 0114830 | 3/2001 |
| WO | 0169172 | 9/2001 |
| WO | 03062744 | 7/2003 |

OTHER PUBLICATIONS

P. Hebert, "A Self-Referenced Hand-Held Range Sensor", in proc. of the 3rd International Conference on 3D Digital Imaging and Modeling (3DIM 2001), May 28-Jun. 1, 2001, Quebec City, Canada, pp. 5-12).

F. Blais, "A Review of 20 Years of Range Sensor Development", in proceedings of SPIE-IS&T Electronic Imaging, SPIE vol. 5013, 2003, pp. 62-76.

S. Rusinkiewicz et al., "Real-Time 3D Model Acquisition", in ACM Transactions on Graphics, vol. 21, No. 3, Jul. 2002, pp. 438-446.

F. Blais et al. "Accurate 3D Acquisition of Freely Moving Objects", in proc. of the Second International Symposium on 3D Data Processing, Visualization and Transmission, Sep. 6-9, 2004, NRC 47141, Thessaloniki, Greece.

J.Y. Bouguet et al., "3D Photography Using Shadows in Dual-Space Geometry", Int. Journal of Computer Vision, vol. 35, No. 2, Nov.-Dec. 1999, pp. 129-149.

M. W. Walker et al., "Estimating 3-D location parameters using dual numbers quaternions", CVGIP : Image Understanding, Nov. 1991, vol. 54, No. 3, pp. 358-367.

E. Trucco et al., Introductory techniques for 3-D computer vision, Prentice Hall, 1998, p. 101-108.

M. Fischler et al., "Random sample consensus : A paradigm for model fitting with applications to image analysis and automated cartography", Communications of the Assoc. for Computing Machinery, Jun. 1981, vol. 24, No. 6, pp. 381-395.

Carsten Reich et al., "3-D shape measurement of complex objects by combining photogrammetry and fringe projection", Optical Engineering, Society of Photo-Optical Instrumentation Engineers, vol. 39 (1) Jan. 2000, pp. 224-231, USA.

* cited by examiner

AUTO-REFERENCED SYSTEM AND APPARATUS FOR THREE-DIMENSIONAL SCANNING

CROSS-REFERENCE TO RELATED APPLICATIONS

The present application is a 35 U.S.C. 371 national phase entry of International Patent Application number PCT/CA2006/000370 filed Mar. 13, 2006 and amended under Article 19 during the International Phase, which claims priority of U.S. provisional patent application No. 60/660,471 filed Mar. 11, 2005, all of which are hereby incorporated by reference.

TECHNICAL FIELD

The present invention generally relates to the field of three-dimensional scanning of an object's surface geometry, and, more particularly, to a portable three-dimensional scanning apparatus for hand-held operations.

BACKGROUND OF THE INVENTION

Three-dimensional scanning and digitization of the surface geometry of objects is now commonly used in many industries and services and their applications are numerous. A few examples of such applications are: inspection and measurement of shape conformity in industrial production systems, digitization of clay models for industrial design and styling applications, reverse engineering of existing parts with complex geometry, interactive visualization of objects in multimedia applications, three-dimensional documentation of artwork and artifacts, human body scanning for better orthesis adaptation or biometry.

The shape of an object is scanned and digitized using a ranging sensor that measures the distance between the sensor and a set of points on the surface. From these measurements, three dimensional coordinates of points on the target surface are obtained in the sensor reference frame. From a given viewpoint, the ranging sensor can only acquire distance measurements on the visible portion of the surface. To digitize the whole object, the sensor must therefore be moved to a plurality of viewpoints in order to acquire sets of range measurements that cover the entire surface. A model of the object's surface geometry can be built from the whole set of range measurements provided in a global common coordinate system.

Different principles have been developed for range sensors (see F. Blais, "A Review of 20 Years of Range Sensor Development", in proceedings of SPIE-IS&T Electronic Imaging, SPIE Vol. 5013, 2003, pp. 62-76). Among them, interferometry, time-of-flight and triangulation-based principles are well known principles that are each more or less appropriate depending on the requirements on accuracy, the standoff distance between the sensor and the object, and the required depth of field.

We are especially interested in triangulation-based range sensors that are generally adequate for close range measurements, typically inferior to a few meters. Using this type of apparatus, one must collect two observations of a same feature point on the object from two different viewpoints separated by a baseline distance. From the baseline and two ray directions, the relative position of the observed point can be recovered. The intersection of both rays is solved for using the knowledge of one side length and two angles in the triangle. This is actually the principle of passive stereovision. One can replace a light detector with a light projector issuing a set of rays in known directions. In this case, it is possible to exploit the orientation of the projector and each detected ray reflected on the object's surface for solving a triangle. In both cases, it is possible to calculate the coordinates of each observed feature point relative to the basis of the triangle. Although specialized light detectors can be used, digital CCD or CMOS cameras are typically used.

The usage of a light projector facilitates the detection of reflected points anywhere on the object's surface so as to provide a dense set of measured surface points. Typically, the light source is a laser source projecting a spot, a light plane or many other possible patterns of projection such as a crosshair. This type of projector with coherent light offers good depth of field characteristics but is subject to speckle noise. It is also possible to project non coherent light patterns (e.g. white light) to avoid speckle when a loss in the depth of field is less critical.

To scan an object means to collect points on its surface. The points can be further structured in the form of curves (profiles) or range images. To scan the whole surface of an object, one must displace the sensor. Although it is possible to move the projector independently (see J. Y. Bouguet and P. Perona, "3D Photography Using Shadows in Dual-Space Geometry", Int. Journal of Computer Vision, vol. 35, No. 2, November-December 1999, pp. 129-149.) the sensor is usually a single assembly comprising the light detector and the projector. The light detector and the projector can be a rigid set or it is also common that the light projector be a scanning mechanism within the sensor device. The sensor can be moved around the object using a mechanical system or hand-held for more versatility. Portable hand-held systems are especially useful for rapid scanning and for objects that must be scanned on site.

Using a hand-held system, the main challenge is to continuously estimate the position and orientation (6 degrees of freedom) of the apparatus in a global coordinate system fixed relative to the object. This can be accomplished using a positioning device (see U.S. Pat. No. 6,508,403) that is coupled to the range scanner. Using a positioning device significantly increases the complexity and cost of the apparatus. It is also cumbersome in some cases or noisy enough to limit the quality of the integrated data.

To avoid the usage of an external positioning device, an alternative consists of using the 3D measurements collected on a rigid object in order to compute the relative position and orientation between the apparatus and the object. It is even possible to hold and displace the object in hand while scanning (see S. Rusinkiewicz, O. Hall-Holt and M. Levoy, "Real-Time 3D Model Acquisition", in ACM Transactions on Graphics, vol. 21, no. 3, July 2002, pp. 438-446, F. Blais, M. Picard and G. Godin, "Accurate 3D Acquisition of Freely Moving Objects," in proc. of the Second International Symposium on 3D Data Processing, Visualization and Transmission. Thessaloniki, Greece. Sep. 6-9, 2004. NRC 47141). This idea of integrating the computation of the position directly into the system while exploiting measurement is interesting but these systems depend completely on the geometry of the object and it is not possible to ensure that an accurate estimate of the pose be maintained. For instance, objects whose geometry variation is weak or objects with local symmetries with spherical, cylindrical or planar shapes, lead to non constant quality in positioning.

One can exploit principles of photogrammetry by using fixed points or features that can be re-observed from various viewpoints in the scene. These positioning features can be natural points in the scene but in many cases their density or quality is not sufficient and target positioning features are set in the scene. One may thus collect a set of images and model the 3D set of positioning features in a common global coordinate system. One can further combine this principle using a camera with a 3D surface scanner. The complementarity of photogrammetry and range sensing has been developed (see, for example, the Tritop™ by GOM mbH which is a an optical coordinate measuring machine.) where a white light projector is used with cameras enlighting retro-reflective targets. Using this type of system, a photogrammetric model of the set of retro-reflective targets is measured and built beforehand, using a digital camera. Then, the 3D sensor apparatus is displaced at a set of fixed positions to measure the surface geometry. The range images can be registered to the formerly constructed model of positioning features since the 3D sensor apparatus can detect the retro-reflective targets.

An interesting idea is to integrate within a same system a hand-held scanner projecting a light pattern but also with the capability of self-positioning while simultaneously observing positioning features. Hebert (see P. Hébert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12) proposed to project laser points on the object to be scanned with an external fixed projector to help position the hand-held sensor. Nevertheless, although the system is freely hand-held, it is limited since it does not build a model of the positioning feature points dynamically; there must exist a single viewpoint where all—three—positioning feature points are visible.

SUMMARY OF THE INVENTION

It would thus be of great interest to simultaneously scan and model the object's surface while accumulating a second model of the positioning features in real-time using a single hand-held sensor. Furthermore, by fixing additional physical targets as positioning features on an object, it would be possible to hold the object in one hand while holding the scanner in the second hand without depending on the object's surface geometry for the quality of the calculated sensor positions.

It is therefore an aim of the present invention to provide a 3D laser scanning system that can simultaneously measure the 3D surface geometry and measure a model of a set of positioning features for positioning.

It is further an aim of the present invention to provide a compact apparatus embedding a hand-held sensing device for scanning the surface geometry of an object.

It is still a further aim of the present invention to provide an improved method for 3-D scanning of objects.

Therefore, in accordance with the present invention, there is provided a system for three-dimensional scanning, said system comprising a hand-held sensing device including a set of at least one laser pattern projector, a set of at least two objectives and light detectors, said sensing device providing images from each light detector; and an image processor configured for obtaining at least one set of 2D surface points originating from the reflection of the said projected laser pattern on the object's surface and at least two sets of 2D positioning features originating from the observation of target positioning features; and a 3D surface point calculator for transforming the said sets of 2D surface points into a set of 3D surface points related to the sensor coordinate system; and a 3D positioning feature calculator for transforming the said sets of 2D positioning features into a set of calculated 3D positioning features related to the sensor coordinate system; and a positioning feature matcher for matching the sets of 3D positioning features and 2D positioning features to an accumulated representation of the already observed positioning features and calculating the spatial relationship between the current sensing device and the said accumulated representation of positioning features; and a 3D positioning feature transformer for transforming the sets of 3D positioning features into a set of calculated 3D positioning features related to the global coordinate system; and a 3D reference positioning feature model builder for calculating, updating and accumulating a representation of the already observed 3D positioning features; and a 3D surface point transformer for transforming the said set of 3D surface points into a global coordinate system related to the 3D positioning feature representation.

Also in accordance with the present invention, there is provided an apparatus embedding a hand-held sensing device including a set of at least one laser pattern projector, a set of at least two objectives and light detectors, wherein a subset of said light detectors comprise a light source for illuminating and facilitating the detection of retro-reflective target reference points in the scene, said apparatus being connected to a computer for providing at least one set of 2D surface points originating from the reflection of the projected pattern on the object's surface and at least one set of 2D positioning features originating from the observation of target positioning features.

Further in accordance with the present invention, there is provided a method for obtaining 3D surface points in a global coordinate system using a hand-held device, comprising the steps of obtaining at least one set of 2D surface points originating from the reflection of the laser projected pattern on the object's surface and at least two sets of 2D positioning features originating from the observation of target positioning features; and transforming the said sets of 2D surface points into a set of 3D surface points related to the sensor coordinate system; and transforming the said sets of 2D positioning features into a set of calculated 3D positioning features related to the sensor coordinate system; and matching the sets of 3D positioning features and 2D positioning features to an accumulated representation of the already observed positioning features and calculating the spatial relationship between the current sensing device and the said accumulated representation of positioning features; and transforming the sets of 3D positioning features into a set of calculated 3D positioning features related to the global coordinate system; and calculating, updating and accumulating a representation of the already observed 3D positioning features; and transforming the said set of 3D surface points into a global coordinate system related to the 3D positioning feature representation.

Further, in accordance with the present invention, there is provided a method for obtaining 3D surface points of an object in an object coordinate system using an hand-held device, said method comprising providing a projection pattern on said object; securing a set of positioning features on said object such that said object and, accordingly, said object coordinate system can be moved in space while said positioning features stay still on said object; acquiring a pair of 2D images of said projection pattern on said object and of at least part of said set of positioning features, an acquiring position of said pair of 2D images being defined in a sensing device coordinate system; extracting, from said pair of 2D images, a pair of sets of 2D surface points originating from said projection pattern and a pair of sets of 2D positioning features originating from said at least part of said set of positioning features; calculating a set of 3D surface points in said sensing device coordinate system using said pair of sets of 2D surface points; calculating a set of 3D positioning features in said sensing device coordinate system using said pair of sets of 2D positioning features; computing transformation parameters for characterizing a current spatial relationship between said sensing device coordinate system and said object coordinate system, by matching corresponding features between said set of calculated 3D positioning features in said sensing device coordinate system and a set of reference 3D positioning features in said object coordinate system, said reference 3D positioning features being cumulated from previous observations; transforming said set of calculated 3D surface points in said sensing device coordinate system into a set of transformed 3D surface points in said object coordinate system using said transformation parameters; transforming said set of calculated 3D positioning features in said sensing device coordinate system into a set of transformed 3D positioning features in said object coordinate system using said transformation parameters; and cumulating said set of transformed 3D positioning features to provide and augment said set of reference 3D positioning features.

Also in accordance with the present invention, there is provided a system for acquiring a 3D surface points of an object in an object coordinate system, said system comprising a sensing device having a pattern projector for providing a projection pattern on said object, a pair of cameras for acquiring a pair of 2D images of said projection pattern on said object and of at least part of a set of positioning features, and a sensing device coordinate system, said set of positioning features being secured on said object such that said object and, accordingly, said object coordinate system can be moved in space while said positioning features stay still on said object; an image processor for extracting, from said pair of 2D images, a pair of sets of 2D surface points originating from said projection pattern and a pair of sets of 2D positioning features originating from said at least part of said set of positioning features; a 3D surface point calculator for calculating a set of 3D surface points in said sensing device coordinate system using said pair of sets of 2D surface points; a 3D positioning features calculator for calculating a set of 3D positioning features in said sensing device coordinate system using said pair of sets of 2D positioning features; a positioning features matcher for computing transformation parameters to characterize a current spatial transformation between said sensing device coordinate system and said object coordinate system, by matching corresponding features between said set of calculated 3D positioning features in said sensing device and a set of reference 3D positioning features in said object coordinate system, said set of reference 3D positioning features being obtained from previous observations; a 3D surface point transformer for transforming said set of calculated 3D surface points in said sensing device coordinate system into a set of transformed 3D surface points in said object coordinate system using said transformation parameters; a 3D positioning features transformer for transforming said set of calculated 3D positioning features in said sensing device coordinate system into a set of transformed 3D positioning features in said object coordinate system using said transformation parameters; and a reference positioning features builder for cumulating said set of transformed 3D positioning features to provide and augment said set of reference 3D positioning features.

Also in accordance with the present invention, there is provided an auto-referenced sensing device for scanning an object to provide 3D surface points thereof in an object coordinate system, said sensing device comprising: a sensing device current coordinate system; a pattern projector for providing a projection pattern on said object; a pair of cameras for acquiring a pair of 2D images of said projection pattern and of at least part of a set of positioning features, said positioning features being located such that at least part of said positioning features are in said pair of 2D images at a given time, a spatial relationship between said pair of cameras being known, said pair of 2D images for providing calculated 3D surface points of said object and calculated 3D positioning features in said sensing device current coordinate system, said calculated 3D positioning features for characterizing a spatial transformation between said current sensing device coordinate system and said object coordinate system by matching corresponding features between said set of calculated 3D positioning features in said sensing device current coordinate system and in a set of reference 3D positioning features in said object coordinate system, transformed 3D surface points in said object coordinate system being calculated using said transformation.

A system, apparatus and method for three-dimensional scanning and digitization of the surface geometry of objects are claimed. The system comprises a hand-held apparatus that is auto-referenced. The system is auto-referenced since it does not need any positioning device to provide the 6 degree of freedom transformations that are necessary to integrate 3D measurements in a global coordinate system while the apparatus is manipulated to scan the surface. The system continuously calculates its own position and orientation from observation while scanning the surface geometry of an object. To do so, the system exploits a triangulation principle and integrates an apparatus that captures both surface points originating from the reflection of a projected laser pattern on an object's surface and 2D positioning features originating from the observation of target positioning features. A significant advantage of the described system is its capability to implement a method that makes it possible to simultaneously build and match a 3D representation of the positioning features while accumulating the 3D surface points describing the surface geometry.

BRIEF DESCRIPTION OF THE DRAWINGS

Having thus generally described the nature of the invention, reference will now be made to the accompanying drawings, showing by way of illustration a preferred embodiment thereof, and in which.

DETAILED DESCRIPTION OF THE PREFERRED EMBODIMENTS

Figure 1:
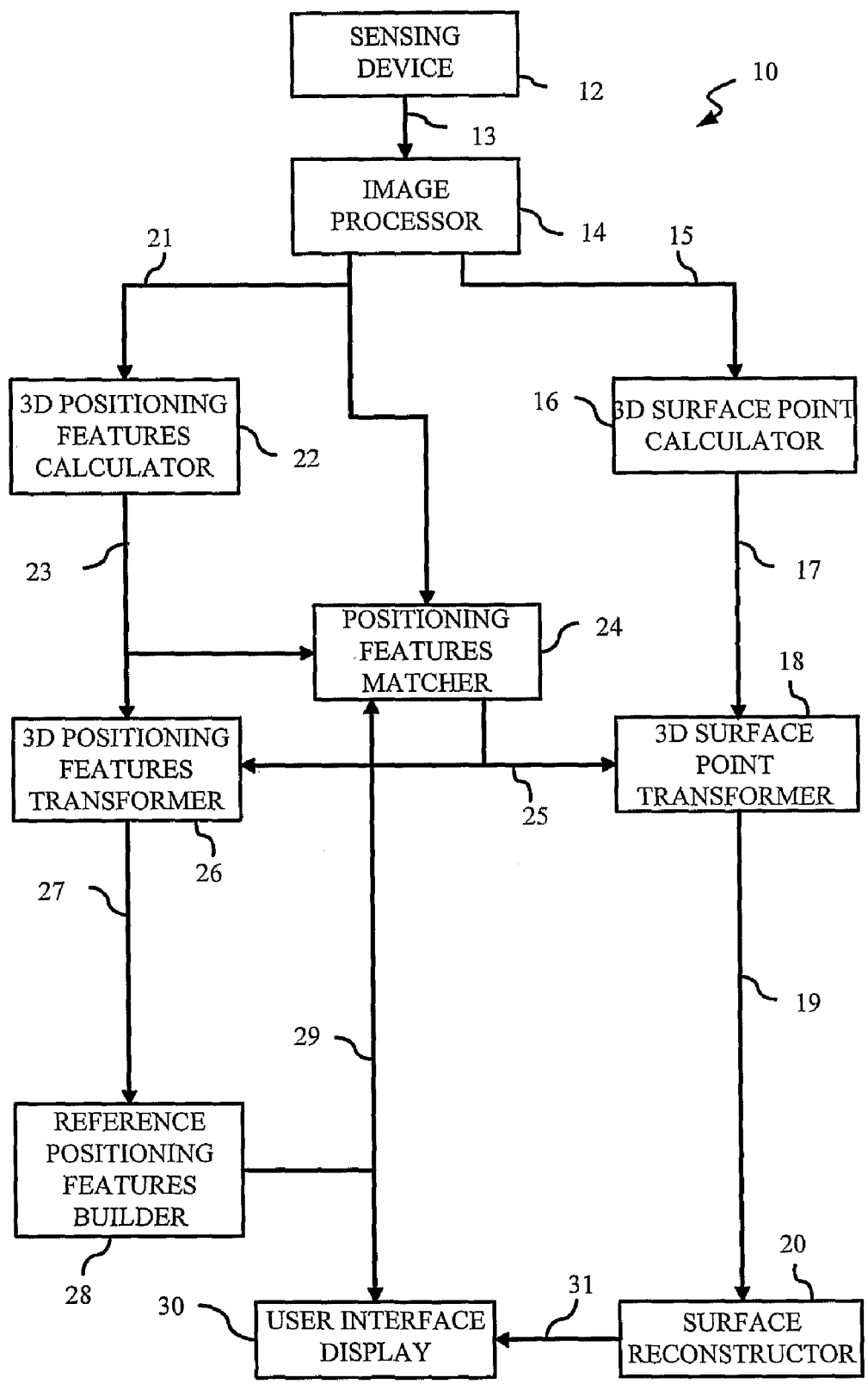
FIG. 1 is a block diagram illustrating a system for three-dimensional surface scanning in accordance with the present invention.

Referring to FIG. 1, the 3D surface scanning system is generally shown at 10.

Sensing Device

The system comprises a sensing device 12 described in more details thereafter in this description. The sensing device 12 collects and transmits a set of images 13, namely a frame, of the observed scene to an image processor 14. These images are collected from at least two viewpoints where each of these viewpoints has its own center of projection. The relevant information encompassed in the images results from the laser projection pattern reflected on the object's surface as well as positioning features that are used to calculate the relative position of the sensing device with respect to other frame captures. Since all images in a given frame, are captured simultaneously and contain both positioning and surface measurements, synchronisation of positioning and surface measurement is implicit.

The positioning features are secured on the object such that the object can be moved in space while the positioning features stay still on the object and, accordingly, with respect to the object's coordinate system. It allows the object to be moved in space while its surface is being scanned by the sensing device.

Image Processor

The image processor 14 extracts positioning features and surface points from each image. For each image, a set of 2D surface points 15 and a second set of observed 2D positioning features 21 are output. These points and features are identified in the images based on their intrinsic characteristics. Positioning features are either the trace of isolated laser points or circular retro-reflective targets. The pixels associated with these features are contrasting with respect to the background and may be isolated with simple image processing techniques before estimating their position using centroïd or ellipse fitting (see E. Trucco and A. Verri, "Introductory techniques for 3-D computer vision", Prentice Hall, 1998, p. 101-108). Using circular targets allows one to extract surface normal orientation information from the equation of the fitted ellipse, therefore facilitating sensing device positioning. The sets of surface points are discriminated from the positioning features since the laser pattern projector produces contrasting curve sections in the images and thus presenting a different 2D shape. The image curve sections are isolated as single blobs and for each of these blobs, the curve segment is analyzed for extracting a set of points on the curve with sub-pixel precision. This is accomplished by convolving a differential operator across the curve section and interpolating the zero-crossing of its response.

For a crosshair laser pattern, one can benefit from the architecture of the apparatus described thereafter. In this configuration with two cameras and a crosshair pattern projector, the cameras are aligned such that one among the two laser planes produces a single straight line in each camera at a constant position. This is the inactive laser plane for a given camera. These inactive laser planes are opposite for both cameras. This configuration, proposed by Hebert (see P. Hébert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12) greatly simplifies the image processing task. It also simplifies the assignation of each set of 2D surface point to a laser plane of the crosshair.

While the sets of surface points 15 follow one path in the system to recover the whole scan of the surface geometry, the sets of observed 2D positioning features 21 follow a second path and are used to recover the relative position of the sensing device with respect to the object's surface. However, these two types of sets are further processed for obtaining 3D information in the sensing device coordinate system.

3D Positioning Features Calculator

Since the sensing device is calibrated, matched positioning features between camera viewpoints are used to estimate their 3D position using the 3D positioning features calculator 22. The sets of observed 2D positioning features are matched using the epipolar constraint to obtain non ambiguous matches. The epipolar lines are calculated using the fundamental matrix that is calculated from the calibrated projection matrices of the cameras. Then, from the known projection matrices of the cameras, triangulation is applied to calculate a single set of calculated 3D positioning features in the sensing device coordinate system 23. This set of points will be fed to the positioning features matcher for providing the observation on the current state of the sensing device, and to the 3D positioning features transformer for an eventual update of the reference 3D positioning features in the object coordinate system.

3D Surface Point Calculator

The 3D surface point calculator 16 takes as input the extracted sets of 2D surface points 15. These points can be associated with a section of the laser projected pattern, for instance one of the two planes for the crosshair pattern. When the association is known, each of the 2D points can be transformed into a 3D point in the sensing device coordinate system by intersecting the corresponding cast ray and the equation of the laser plane. The equation of the ray is obtained from the projection matrix of the associated camera. The laser plane equation is obtained using a pre-calibration procedure (see P. Hébert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12) or exploiting a table look-up after calibrating the sensing device with an accurate translation stage for instance. Both approaches are adequate. In the first case, the procedure is simple and there is no need for sophisticated equipment but it requires a very good estimation of the cameras' intrinsic and extrinsic parameters.

It is also possible to avoid associating each 2D point to a specific structure of the laser pattern. This is particularly interesting for more complex or general patterns. In this case, it is still possible to calculate 3D surface points using the fundamental matrix and exploiting the epipolar constraint to match points. When this can be done without ambiguity, triangulation can be calculated in the same way it is applied by the 3D positioning features calculator 22.

The 3D surface point calculator 16 thus outputs a set of calculated 3D surface points in the sensing device coordinate system 17. This can be an unorganized set or preferably, the set is organized such that 3D points associated with connected segments in the images are grouped for estimating 3D curve tangent by differentiation. This information can be exploited by the surface reconstructor for improved quality of the recovered surface model 31.

Positioning Subsystem

The task of the positioning subsystem, mainly implemented in the positioning features matcher 24 and in the reference positioning features builder 28, is to provide transformation parameters 25 for each set of calculated 3D surface points 17. These transformation parameters 25 make it possible to transform calculated 3D surface points 17 into a single, object coordinate system while preserving the structure; the transformation is rigid. This is accomplished by building and maintaining a set of reference 3D positioning features 29 in the object coordinate system. The positioning features can be a set of 3D points, a set of 3D points with associated surface normal or any other surface characteristic. In this preferred embodiment it is assumed that all positioning features are 3D points, represented as column vectors $[x,y,z]^T$ containing three components denoting the position of the points along the three coordinate axes.

At the beginning of a scanning session, the set of reference 3D positioning features 29 is empty. As the sensing device 12 provides the first measurements and the system calculates sets of calculated 3D positioning features 23, the features are copied into the set of reference 3D positioning features 29 using the identity transformation. This set thus becomes the reference set for all subsequent sets of reference 3D positioning features 29 and this first sensing device position defines the object coordinate system into which all 3D surface points are aligned.

After creation of the initial set of reference 3D positioning features 29, subsequent sets of calculated 3D positioning features 23 are first matched against the reference set 29. The matching operation is divided into two tasks: i) finding corresponding features between the set of calculated 3D positioning features in the sensing device coordinate system 23 and the set of reference 3D features in the object coordinate system, and ii) computing the transformation parameters 25 of the optimal rigid 3D transformation that best aligns the two sets. Once the parameters have been computed, they are used to transform both calculated 3D positioning features 23 and calculated 3D surface points 17 thus aligning them into the object coordinate system.

The input to the positioning features matcher 24 are the set of reference 3D positioning features 29, R, the set of calculated 3D positioning features 23, O, along with two sets of observed 2D positioning features 21, $P_1$ and $P_2$ which were also used by the 3D positioning features calculator 22, as explained above. Matching these sets is the problem of finding two subsets $O_m \subset O$ and $R_m \subset R$, containing N features each, such that all pairs of points $\overline{(o_i, r_i)}$ with $o_i \in O_m$ and $r_i \in R_m$, represent the same physical features. Finding these subsets is accomplished by finding the maximum number of segments of points $\overline{(o_i o_j; r_i r_j)}$, such that $$\left| \|o_i - o_j\| - \|r_i - r_j\| \right| \leq \epsilon \text{ for all } i,j \in \{1, \ldots, N\}, i \neq j, \quad (1)$$

where $\epsilon$ is a predefined threshold which is set to correspond to the accuracy of the sensing device. This constraint imposes that the difference in distance between a corresponding pair of points in the two sets be negligible.

This matching operation is solved as a combinatorial optimization problem where each segment of points from the set O is progressively matched against each segment of points in the set R. Each matched segment is then expanded by forming an additional segment using the remaining points in each of the two sets. If two segments satisfy the constraint (1), a third segment is formed and so on as long as the constraint is satisfied. Otherwise the pair is discarded and the next one is examined. The solution is the largest set of segments satisfying (1). Other algorithms (see M. Fischler and R. Bolles, (1981) "Random sample consensus: A paradigm for model fitting with applications to image analysis and automated cartography", Communications of the Assoc. for Computing Machinery, (June 1981), vol. 24, no. 6, pp. 381-395.) can be used for the same purpose.

As long as the number of elements in the set of reference 3D positioning features 29 is relatively low (typically less than fifteen), the computational complexity of the above approach is acceptable for real-time operation. In practice however, the number of reference 3D positioning features 29 can easily reach several hundreds. Since the computational complexity grows exponentially with the number of features, the computation of corresponding features becomes too slow for real-time applications. The problem is solved by noting that the number of positioning features that are visible from any particular viewpoint is small, being limited by the finite field of view of the sensing device.

This means that if the calculated 3D positioning features 23 can be matched against reference 3D positioning features 29, then the matched features from the reference set are located in a small neighbourhood whose size is determined by the size of the set of calculated 3D positioning features 23. This also means that the number of points in this neighbourhood should be small as well (typically less than fifteen). To exploit this property for accelerating matching, the above method is modified as follows. Prior to matching, a set of neighbouring features $[N_i]$ is created for each reference feature. After the initial segment of points is matched, it is expanded by adding an additional segment using only points in the neighbourhood set $[N_i]$ of the first matched feature. By doing so, the number of points used for matching remains low regardless of the size of the set of reference 3D positioning features 29, thus preventing an exponential growth of the computational complexity.

Alternatively, exploiting spatial correlation of sensing device position and orientation can be used to improve matching speed. By assuming that the displacement of the sensing device is small with respect to the size of the set of positioning features, matching can be accomplished by finding the closest reference feature for each observed positioning feature. The same principle can be used in 2D, that is, by finding closest 2D positioning features.

Once matching is done, the two sets need to be aligned by computing the optimal transformation parameters [M T], in the least-squares sense, such that the following cost function is minimized:

$$\sum_{i=1}^{N} \|r_i - Mo_i + T\|^2, \text{ for all } i \in \{1, \ldots, N\}. \quad (2)$$

The transformation parameters consist of a 3×3 rotation matrix M and a 3×1 translation vector T. Such a transformation can be found using dual quaternions as described in M. W. Walker, L. Shao and R. A. Volz, "Estimating 3-D location parameters using dual number quaternions", CVGIP: Image Understanding, vol. 54, no. 3, November 1991, pp. 358-367. In order to compute this transformation, at least three common positioning features have to be found. Otherwise both positioning features and surface points are discarded for the current frame.

An alternative method for computing the rigid transformation is to minimize the distance between observed 2D positioning features 21 and the projections of reference 3D positioning features 29. Using the perspective projection transformation Π, the rigid transformation [M T] that is optimal in the least-squares sense is the transform that minimizes:

$$\sum_{i=1}^{N} \|\Pi M^{-1}(r_i - T) - p_i\|^2, \text{ for all } i, j \in \{1, \ldots, N\}, \quad (3)$$

where $p_i \in P_1$ or $p_i \in P_2$ are observed 2D features that correspond to the 3D observed feature $o_i \in O_m$. The rigid transformation [M T] can be found by minimizing the above cost function using an optimization algorithm such as the Levenberg-Marquardt method.

3D Positioning Features Transformer

Once the rigid transformation is computed, the 3D positioning features transformer 26 transforms the set of calculated 3D positioning features from the sensing device coordinate system 23 to the object coordinate system 27. The transformed 3D positioning features are used to update the set of reference 3D positioning features 29 in two ways. First, if only a subset of observed features has been matched against the set of reference 3D positioning features 29, the unmatched observed features represent newly observed features that are added to the reference set. The features that have been re-observed and matched can be either discarded (since they are already in the reference set) or used to improve, that is, filter the existing features. For example, all observations of the same feature can be summed together in order to compute the average feature position. By doing so, the variance of the measurement noise is reduced thus improving the accuracy of the positioning system.

3D Surface Point Transformer

The processing steps for the surface points are simple once the positioning features matcher 24 makes the transformation parameters 25 available. The set of calculated 3D surface points in the sensing device coordinate system 17 provided by the 3D surface point calculator 16 are then transformed by the 3D surface point transformer 18 using the same transformation parameters 25 provided by the positioning features matcher 24, which is the main link of information between the positioning subsystem and the integration of surface points in the object coordinate system. The resulting set of transformed 3D surface points in the object coordinate system 19 is thus naturally aligned in the same coordinate system with the set of reference 3D positioning features 29. The final set of 3D surface points 19 can be visualized or preferably fed to a surface reconstructor 20 that estimates a continuous non-redundant and possibly filtered surface representation 31 that is displayed, on a user interface display 30, optionally with the superimposed set of reference 3D positioning features 29.

Figure 2:
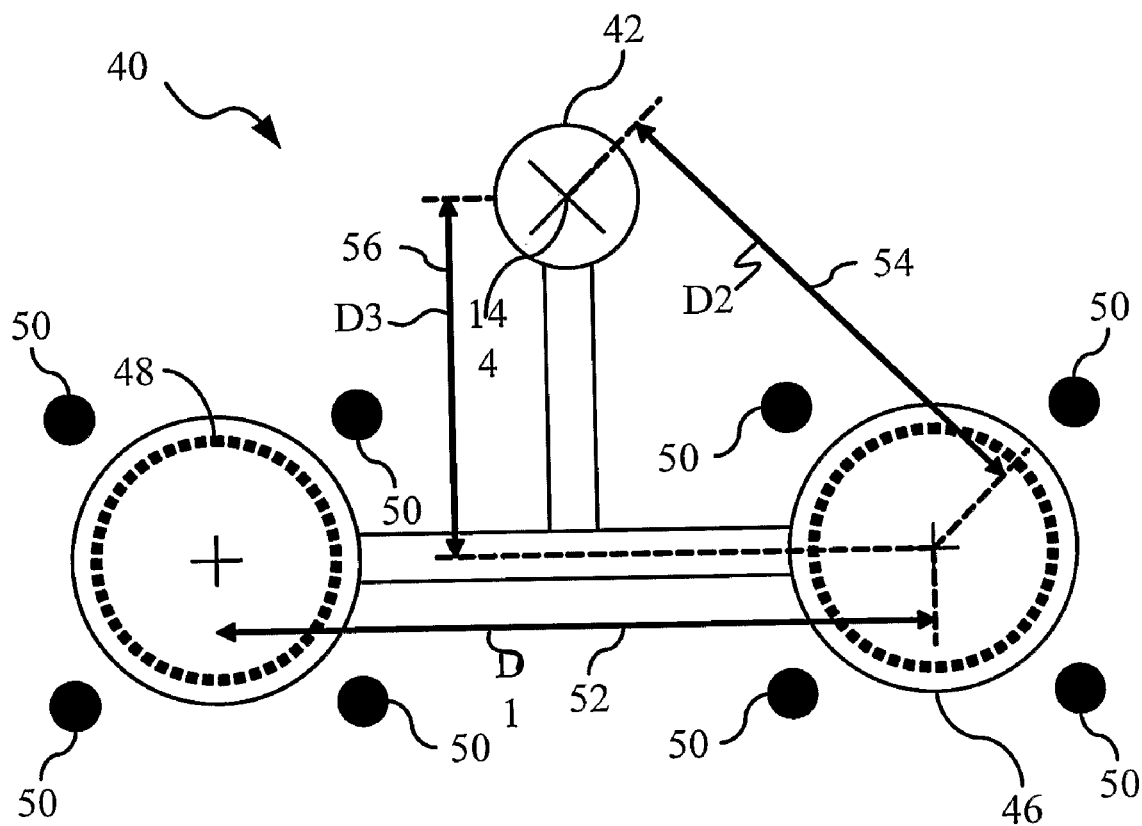
FIG. 2 depicts a configuration of an apparatus for three-dimensional surface scanning in accordance with the present invention.

Having described the system, a closer view of the sensing device is now detailed. FIG. 2 illustrates a front view of a sensing device 40 that is used in this preferred embodiment of the system. The device comprises two objectives and light detectors 46 that are typically progressive scan digital cameras. The two objectives and light detectors 46 have their centers of projection separated by a distance D1 52, namely the baseline, and compose a passive stereo pair of light detectors. The laser pattern projector 42 is preferably positioned at a distance D3 56 from the baseline of the stereo pair to compose a compact triangular structure leading to two additional active sensors, themselves composed in the first case by the left camera and the laser pattern projector and, in the second case by the right camera and the laser pattern projector. For these two additional active stereo pairs, the baseline D2 54 is depicted in the figure.

In FIG. 2, besides the laser pattern projector, the sensing device further comprises light sources for positioning. These are two sets of LEDs 50 distributed around the light detectors 46. These LEDs illuminate retro-reflective targets that are used as positioning features. The LEDs are preferably positioned as close as possible to the optical axes of the cameras in order to capture a stronger signal from the retro-reflective targets. Interference filters 48 are mounted in front of the objectives. These filters attenuate all wavelengths except for the laser wavelength that is matched to the LEDs' wavelength. This preferred triangular structure is particularly interesting when D3 56 is such that the triangle is isosceles with two 45 degree angles and a 90 degree angle between the two laser planes of the crosshair 44. With this particular configuration, the crosshair pattern is oriented such that each plane is aligned with both the center of projection of each camera as well as with the center of the light detectors. This corresponds to the center epipolar line where the main advantage is that one laser plane (the inactive plane) will always be imaged as a straight line at the same position in the image, independently of the observed scene. The relevant 3D information is then extracted from the deformed second plane of light in each of the two images. The whole sensing device is thus composed of two laser profilometers, one passive stereo pair and two modules for simultaneously capturing retro-reflective targets. This preferred configuration is compact.

For a hand-held device, the baseline D1 will be typically around 200 mm for submillimeter accuracy at a standoff distance of 300 to 400 mm between the sensing device and the object. By scaling D1, distances D2 automatically follow. Although this arrangement is particularly useful for simplifying the discrimination between the 2D positioning features and the projected laser pattern in the images, integrating a stereo pair and eventually one or more additional cameras for a better discrimination and accuracy, makes it possible to process images where a different laser pattern is projected. Grids and circular patterns are relevant examples. Another possibility is to increase or decrease D3 for more or less accuracy while losing the advantage of simplified image processing. While a linear configuration (i.e. D3=0) would not provide all the advantages of the above described configuration, it is still one option.

Figure 3:
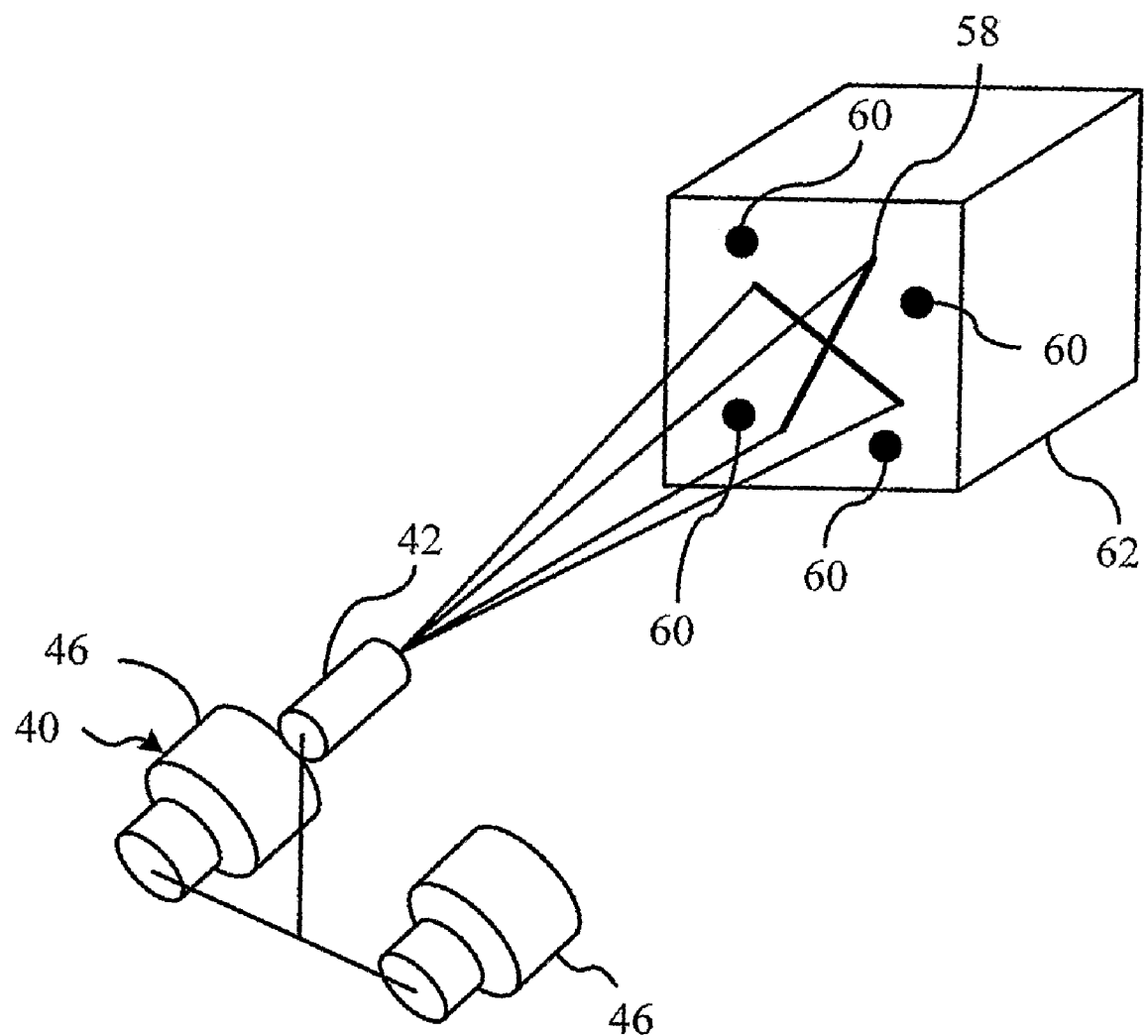
FIG. 3 illustrates a configuration of the apparatus depicted in FIG. 2 along with the object to be measured during acquisition, in accordance with the present invention.

FIG. 3 illustrates a 3D view of the sensing device while observing an object to be measured 62. One can see the formerly described compact triangular architecture comprising two cameras with objectives 46 and a crosshair laser pattern projector 42. The sensing device captures the image of the projected pattern 58 including a set of positioning features 60.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

One skilled in the art should understand that the positioning features, described herein as retro-reflective targets, could alternatively be provided by light sources, such as LEDs, disposed on the surface of the object to be scanned or elsewhere, or by any other means that provide targets to be detected by the sensing device. Additionally, the light sources provided on the sensing device could be omitted if the positioning features themselves provide the light to be detected by the cameras.

It should be understood that the pattern projector hereinabove described as comprising a laser light source could also use a LED source or any other appropriate light source.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

The invention claimed is:

1. A system for obtaining three-dimensional surface points of an object in an object coordinate system, comprising:
    a set of target positioning features on said object, each of said target positioning features being provided at a fixed position on said object, said object coordinate system being defined using said target positioning features;

a sensing device having a pattern projector for providing a projected pattern on a surface of said object, at least a pair of cameras each for acquiring a 2D image of said object, said projected pattern and at least a portion of said set of target positioning features being apparent on said images, each of said 2D images being acquired from a view point referenced in a sensing device coordinate system;

an image processor for extracting, from said 2D images, at least one set of 2D surface points from a reflection of said projected pattern on said surface, and at least two sets of 2D positioning features from a reflection of said target positioning features on said surface;

a 3D surface point calculator for calculating a set of 3D surface points in said sensing device coordinate system using said set of 2D surface points;

a 3D positioning feature calculator for calculating a set of calculated 3D positioning features in said sensing device coordinate system using said sets of 2D positioning features;

a positioning features matcher for computing transformation parameters to characterize a current spatial relationship between said sensing device coordinate system and said object coordinate system, by matching corresponding features between said set of calculated 3D positioning features in said sensing device coordinate system and a set of reference 3D positioning features in said object coordinate system, said reference 3D positioning features being cumulated from previous observations;

a 3D positioning feature transformer for transforming said set of calculated 3D positioning features into a set of transformed 3D positioning features in said object coordinate system using said transformation parameters;

a 3D surface point transformer for transforming said set of 3D surface points into a set of transformed 3D surface points in said object coordinate system using said transformation parameters; and a 3D reference positioning feature model builder for cumulating said set of transformed 3D positioning features to provide and augment said set of reference 3D positioning features.

2. The system as claimed in claim 1, further comprising a wireless transmitter for at least one of transmitting said pair of 2D images from said sensing device to said image processor and transmitting said transformed 3D surface points.

3. The system as claimed in claim 1, further comprising a surface reconstructor for cumulating said set of transformed 3D surface points to provide a 3D surface model of said object.

4. The system as claimed in claim 3, further comprising a display for visualizing said 3D surface model of said object.

5. The system as claimed in claim 1, further comprising a display for visualizing said reference 3D positioning features.

6. The system as claimed in claim 1, wherein said projection pattern comprises a crosshair pattern having two light planes.

7. The system as claimed in claim 6, wherein said crosshair pattern is oriented such that each of said light planes is aligned with an epipolar plane defined by one camera of said pair of cameras and said pattern projector.

8. The system as claimed in claim 1, wherein said pattern projector and said pair of cameras define an isosceles rectangular triangle and a symmetrical configuration and wherein said two light planes define a right angle.

9. The system as claimed in claim 1, wherein target positioning features are projected on said surface using a set of external fixed projectors.

10. The system as claimed in claim 1, wherein said positioning features are fixedly secured on said surface of said object.

11. The system as claimed in claim 10, wherein said positioning features are retro-reflective targets and wherein said sensing device further has at least one light source for illuminating at least part of said set of positioning features.

12. The system as claimed in claim 10, wherein each camera of said pair of cameras is associated with at least one of said light source positioned close to a center of projection of said camera.

13. The system as claimed in claim 1, further comprising an electronic chip for implementing at least one of said image processor, said 3D surface point calculator, said 3D positioning features calculator, said positioning features matcher, said 3D positioning features transformer, said reference 3D positioning feature model builder and said 3D surface point transformer.

14. An auto-referenced sensing device for scanning an object to provide three-dimensional surface points in an object coordinate system comprising:

a Light-Emitting Diode (LED) light source emitting light for illuminating and enabling image acquisition of at least a portion of a set of retro-reflective target positioning features, wherein each of said retro-reflective target positioning features is provided at a fixed position on said object;

a laser pattern projector for providing a projected laser pattern on a surface of said object for illuminating and enabling image acquisition of points between at least two of said retro-reflective target positioning features in said portion of said set;

at least a pair of cameras each for acquiring a 2D image of said object, wherein said projected laser pattern and said portion of said set of retro-reflective target positioning features is apparent on said images, a spatial relationship between said pair of cameras being known, said LED light source being provided in close proximity to said at least said pair of cameras;

wherein said portion of said set of retro-reflective target positioning features reflect at least of said light emitted by said Light-Emitting Diode (LED) light source towards said cameras;

an image processor for extracting, from said 2D images, at least one set of 2D surface points from a reflection of said projected pattern on said surface, and at least two sets of 2D positioning features from a reflection of said target positioning features on said surface;

a 3D surface point calculator for calculating a set of 3D surface points in said sensing device coordinate system using said set of 2D surface points;

a 3D positioning feature calculator for calculating a set of calculated 3D positioning features in said sensing device coordinate system using said sets of 2D positioning features;

a positioning features matcher for computing transformation parameters to characterize a current spatial relationship between said sensing device coordinate system and said object coordinate system, by matching corresponding features between said set of calculated 3D positioning features in said sensing device coordinate system and a set of reference 3D positioning features in said object coordinate system, said reference 3D positioning features being cumulated from previous observations;

a 3D positioning feature transformer for transforming said set of calculated 3D positioning features into a set of transformed 3D positioning features in said object coordinate system using said transformation parameters;

a 3D surface point transformer for transforming said set of 3D surface points into a set of transformed 3D surface points in said object coordinate system using said transformation parameters; and a 3D reference positioning feature model builder for cumulating said set of transformed 3D positioning features to provide and augment said set of reference 3D positioning features.

15. The auto-referenced sensing device as claimed in claim 14, further comprising an electronic chip for implementing at least one of said image processor, said 3D surface point calculator, said 3D positioning features calculator, said positioning features matcher, said 3D positioning features transformer, said reference 3D positioning feature model builder and said 3D surface point transformer.

16. The auto-referenced sensing device as claimed in claim 15, further comprising a transmitter for transmitting said transformed 3D surface points of said object.

17. The auto-referenced sensing device as claimed in claim 14, further comprising a transmitter for transmitting said 2D images of said object.

18. The auto-referenced sensing device as claimed in claim 17, wherein said transmitter is a wireless transmitter.

19. A method for obtaining three-dimensional surface points of an object in an object coordinate system, comprising:

providing a projected pattern on a surface of said object using a pattern projector;

providing a set of target positioning features on said object, each of said target positioning features being provided at a fixed position on said object, said object coordinate system being defined using said target positioning features, said target positioning features being provided by one of a set of external fixed projectors projecting said features and affixed features;

acquiring at least a pair of 2D images of said object by at least a pair of cameras with a known spatial relationship, said projected pattern and at least a portion of said set of target positioning features being apparent on said images, each of said 2D images being acquired from a view point referenced in a sensing device coordinate system;

using an electronic chip in communication with said at least said pair of cameras for implementing the steps of:

extracting, from said 2D images, at least one set of 2D surface points from a reflection of said projected pattern on said surface, and at least two sets of 2D positioning features from a reflection of said target positioning features on said surface;

calculating a set of 3D surface points in said sensing device coordinate system using said set of 2D surface points;

calculating a set of calculated 3D positioning features in said sensing device coordinate system using said sets of 2D positioning features;

computing transformation parameters for characterizing a current spatial relationship between said sensing device coordinate system and said object coordinate system, by matching corresponding features between said set of calculated 3D positioning features in said sensing device coordinate system and a set of reference 3D positioning features in said object coordinate system, said reference 3D positioning features being cumulated from previous observations;

transforming said set of calculated 3D positioning features into a set of transformed 3D positioning features in said object coordinate system using said transformation parameters;

cumulating said set of transformed 3D positioning features to provide and augment said set of reference 3D positioning features; and transforming said set of 3D surface points into a set of transformed 3D surface points in said object coordinate system using said transformation parameters.

20. The method as claimed in claim 19, wherein said electronic chip further implements the step of cumulating said set of transformed 3D surface points to provide a 3D surface model of said object.

21. The method as claimed in claim 19, wherein said positioning features are fixedly secured on said surface of said object.

22. The method as claimed in claim 21, wherein said positioning features are retro-reflective targets, said method further comprising illuminating at least part of said set of positioning features by a light source.

23. The method as claimed in claim 21, wherein said positioning features are circular targets and wherein said calculated 3D positioning features further comprise surface normal orientation.

24. The method as claimed in claim 19, wherein said computing comprises finding an optimal rigid 3D transformation that best aligns said set of calculated 3D positioning features and said set of reference 3D positioning features.

* * * * *